UNITED STATES PATENT OFFICE.

HENRIQUE DA COSTA CORRÊA LEITE, OF LISBON, PORTUGAL.

PAPER MANUFACTURE FROM THE PLANT GALEGA.

SPECIFICATION forming part of Letters Patent No. 293,566, dated February 12, 1884.

Application filed January 23, 1884. (Specimens.)

*To all whom it may concern:*

Be it known that I, HENRIQUE DA COSTA CORRÊA LEITE, a subject of the King of Portugal, residing at Lisbon, Portugal, have invented certain new and useful Improvements in Paper Manufacture from the Plant Galega, of which the following is a specification.

My invention relates to the manufacture of paper from the plant *Galega orientalis* and *officinalis*. This plant is practically unknown in the United States, but can be grown in ordinary soil, and will yield from five to seven crops per annum, depending upon the climate. The plant is sown like lucern or plants of that class. The plant grows to the height of one and a half meter; but when used for manufacturing paper-pulp it is only permitted to grow to the height of ten centimeters. When cut, the plant is permitted to become partially dried, and is then placed in a bath of water and retained in said bath from three to five days, after which it is passed between rolls or is kneaded in order to open the knots. After having been thoroughly washed, so as to remove all earthy matters, the plant is placed in a boiler containing water and about three per centum of lime. After having remained in this alkaline water a sufficient time, the water is drawn off, and a lotion consisting of about three per cent. of lime and five per cent. of soda is added, and the plant boiled in this lotion about six or eight hours under a pressure of one atmosphere. It is then removed from the boiler, opened, and washed, and is of a light yellow color. It is then well opened, kneaded, washed, and compressed, and placed in a bath of chloride of lime of a strength equal to 2° Baumé, and remains in this bath for several hours. It is next placed in a drying-tank, where it remains about twelve hours. Having arrived at the colors desired, it is finally passed to the triturator and refining-machine, some white crayon, alum, or any suitable coloring-matter being added, as may be required.

The paper made from the fiber of this plant does not require an admixture of rag pulp, as is the case with paper made from wood and straw pulp.

The fiber of the paper made from the galega plant is strong and not brittle.

It is not necessary that I shall treat the plant precisely as stated above, as I may treat it in other manners without departing from the spirit of the invention.

Having thus described my invention, what I claim is—

1. The process of making paper from the galega plant, which consists in placing the plant in a water bath, then rolling or kneading it, then boiling it in lime-water, then boiling it in a lotion of lime and soda, after which it is again washed, compressed, and placed in a bath of chloride of lime, and after being removed from this bath and dried is finally triturated and refined, substantially as set forth.

2. As a new article of manufacture, paper made from the galega plant, the pulp being obtained by washing and boiling the plant in suitable solutions, then rolling, triturating, and refining it, the paper requiring no admixture of rag pulp for felting it, substantially as set forth.

In testimony whereof I affix my signature in presence of two witnesses.

HENRIQUE DA COSTA CORRÊA LEITE.

Witnesses:
   A. DE MATTOS,
   ANTO. JE. DE CAMPOS PORTO.